(12) United States Patent
Ohno et al.

(10) Patent No.: US 8,586,166 B2
(45) Date of Patent: Nov. 19, 2013

(54) CERAMIC SINTERED BODY AND CERAMIC FILTER

(75) Inventors: Kazushige Ohno, Gifu (JP); Hiroki Sato, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 281 days.

(21) Appl. No.: 12/605,253

(22) Filed: Oct. 23, 2009

(65) Prior Publication Data

US 2010/0107583 A1    May 6, 2010

Related U.S. Application Data

(63) Continuation of application No. 10/541,462, filed as application No. PCT/JP2004/013705 on Sep. 13, 2004, now abandoned.

(30) Foreign Application Priority Data

Sep. 12, 2003    (JP) .................................. 2003-361229

(51) Int. Cl.
    *B32B 3/12*        (2006.01)

(52) U.S. Cl.
    USPC ..................... 428/116; 428/304.4; 428/315.5; 428/317.9

(58) Field of Classification Search
    USPC .......................... 428/116, 304.4, 315.5, 317.9
    See application file for complete search history.

(56) References Cited

U.S. PATENT DOCUMENTS

| | | | |
|---|---|---|---|
| 4,701,426 A * | 10/1987 | Okuno et al. | ................... 501/90 |
| 4,729,972 A | 3/1988 | Kodama et al. | |
| 5,098,571 A | 3/1992 | Maebashi | |
| 5,366,943 A * | 11/1994 | Lipowitz et al. | ............. 501/95.1 |
| 5,716,559 A | 2/1998 | Larsen et al. | |
| 5,914,187 A | 6/1999 | Naruse et al. | |
| 5,930,994 A | 8/1999 | Shimato et al. | |
| 5,981,415 A | 11/1999 | Waku et al. | |
| 6,341,701 B1 | 1/2002 | Takashi et al. | |
| 6,447,564 B1 | 9/2002 | Ohno et al. | |
| 6,565,630 B2 | 5/2003 | Ohno et al. | |
| 6,669,751 B1 | 12/2003 | Ohno et al. | |

(Continued)

FOREIGN PATENT DOCUMENTS

| | | |
|---|---|---|
| EP | 0 188 129 A2 | 7/1986 |
| EP | 1 698 604 B1 | 5/2009 |

(Continued)

OTHER PUBLICATIONS

JP 03-232779 human translation.*

(Continued)

*Primary Examiner* — David Sample
*Assistant Examiner* — Lauren Colgan
(74) *Attorney, Agent, or Firm* — Oblon, Spivak, McClelland, Maier & Neustadt, L.L.P.

(57) ABSTRACT

A ceramic porous sintered body including a plurality of ceramic coarse particles and a polycrystalline sintered body forming a bonding layer. The bonding layer exists between the ceramic coarse particles and connects the ceramic coarse particles. The polycrystalline sintered body includes a plurality of ceramic fine particles having an average particle size smaller than the ceramic coarse particles. The ceramic porous sintered body has an average pore diameter of 5 μm to 50 μm. A ratio of an average particle size of the ceramic coarse particle to the ceramic fine particles is 15:1-200:1.

20 Claims, 8 Drawing Sheets

Section view at A-A line

(56) References Cited

U.S. PATENT DOCUMENTS

| | | |
|---|---|---|
| 6,770,116 B2 | 8/2004 | Kojima |
| 6,939,825 B1 | 9/2005 | Ohno et al. |
| 7,112,233 B2 | 9/2006 | Ohno et al. |
| 7,234,296 B2 | 6/2007 | Kojima |
| 7,250,385 B1 | 7/2007 | Ohno et al. |
| 7,284,980 B2 | 10/2007 | Saijo et al. |
| 7,309,370 B2 | 12/2007 | Kudo et al. |
| 7,314,496 B2 | 1/2008 | Hong et al. |
| 7,316,722 B2 | 1/2008 | Komori et al. |
| 7,326,270 B2 | 2/2008 | Hong et al. |
| 7,332,014 B2 | 2/2008 | Ono et al. |
| 7,341,614 B2 | 3/2008 | Hayashi et al. |
| 7,348,049 B2 | 3/2008 | Yoshida |
| 7,387,657 B2 | 6/2008 | Kunieda et al. |
| 7,387,829 B2 | 6/2008 | Ohno et al. |
| 7,393,376 B2 | 7/2008 | Taoka et al. |
| 7,396,586 B2 | 7/2008 | Ohno et al. |
| 7,427,308 B2 | 9/2008 | Taoka et al. |
| 7,427,309 B2 | 9/2008 | Ohno et al. |
| 7,438,967 B2 | 10/2008 | Fujita |
| 7,449,427 B2 | 11/2008 | Ohno et al. |
| 7,455,709 B2 | 11/2008 | Ohno et al. |
| 7,462,216 B2 | 12/2008 | Kunieda et al. |
| 7,473,465 B2 | 1/2009 | Ohno et al. |
| 7,491,057 B2 | 2/2009 | Saijo et al. |
| 7,498,544 B2 | 3/2009 | Saijo et al. |
| 7,504,359 B2 | 3/2009 | Ogyu et al. |
| 7,510,588 B2 | 3/2009 | Kudo |
| 7,517,502 B2 | 4/2009 | Ohno et al. |
| 7,520,178 B2 | 4/2009 | Ohno et al. |
| 7,521,025 B2 | 4/2009 | Ohno et al. |
| 7,524,350 B2 | 4/2009 | Kunieda |
| 7,534,482 B2 | 5/2009 | Yoshida |
| 7,540,898 B2 | 6/2009 | Oshimi |
| 7,541,006 B2 | 6/2009 | Yoshida |
| 7,543,513 B2 | 6/2009 | Kobayashi et al. |
| 7,550,026 B2 | 6/2009 | Hayakawa |
| 7,550,119 B2 | 6/2009 | Kojima |
| 7,556,666 B2 | 7/2009 | Kunieda |
| 7,556,782 B2 | 7/2009 | Ohno et al. |
| 7,588,716 B2 | 9/2009 | Iwata |
| 7,603,793 B2 | 10/2009 | Hoshino et al. |
| 7,611,764 B2 | 11/2009 | Komori et al. |
| 7,625,529 B2 | 12/2009 | Ohno et al. |
| 7,632,452 B2 | 12/2009 | Saijo et al. |
| 7,641,956 B2 | 1/2010 | Yoshida |
| 7,648,547 B2 | 1/2010 | Ohno |
| 7,651,755 B2 | 1/2010 | Yoshida |
| 7,662,458 B2 | 2/2010 | Ninomiya et al. |
| 7,687,013 B2 | 3/2010 | Kawai et al. |
| 7,695,655 B2 | 4/2010 | Yamamura et al. |
| 7,695,671 B2 | 4/2010 | Yamamura et al. |
| 7,704,295 B2 | 4/2010 | Oshimi |
| 2004/0097370 A1* | 5/2004 | Ichikawa et al. .............. 502/439 |
| 2004/0161596 A1 | 8/2004 | Taoka et al. |
| 2005/0109023 A1 | 5/2005 | Kudo et al. |
| 2005/0115224 A1 | 6/2005 | Kojima |
| 2005/0153099 A1 | 7/2005 | Yamada |
| 2005/0169818 A1 | 8/2005 | Ohno et al. |
| 2005/0169819 A1 | 8/2005 | Shibata |
| 2005/0180898 A1 | 8/2005 | Yamada |
| 2005/0247038 A1 | 11/2005 | Takahashi |
| 2005/0266992 A1 | 12/2005 | Ohno et al. |
| 2005/0272602 A1 | 12/2005 | Ninomiya |
| 2006/0029898 A1 | 2/2006 | Saijo et al. |
| 2006/0032203 A1 | 2/2006 | Komori et al. |
| 2006/0043652 A1 | 3/2006 | Saijo et al. |
| 2006/0073970 A1 | 4/2006 | Yamada |
| 2006/0093784 A1 | 5/2006 | Komori et al. |
| 2006/0108347 A1 | 5/2006 | Koyama et al. |
| 2006/0118546 A1 | 6/2006 | Saijo |
| 2006/0194018 A1 | 8/2006 | Ohno et al. |
| 2006/0210765 A1 | 9/2006 | Ohno et al. |
| 2006/0216467 A1 | 9/2006 | Yoshida |
| 2006/0222812 A1 | 10/2006 | Koyama et al. |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199643 A1 | 8/2007 | Kawai et al. |
| 2007/0212517 A1 | 9/2007 | Ohno et al. |
| 2007/0243283 A1 | 10/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0150200 A1 | 6/2008 | Tajima |
| 2008/0160249 A1 | 7/2008 | Makino |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |
| 2009/0199953 A1 | 8/2009 | Sato |
| 2009/0202402 A1 | 8/2009 | Sato |
| 2009/0220735 A1 | 9/2009 | Mizuno et al. |
| 2009/0238732 A1 | 9/2009 | Ohno |
| 2009/0242100 A1 | 10/2009 | Saijo |
| 2009/0243165 A1 | 10/2009 | Hiroshima |
| 2009/0252906 A1 | 10/2009 | Higuchi |

FOREIGN PATENT DOCUMENTS

| | | |
|---|---|---|
| FR | 2 587 026 A | 3/1987 |
| JP | 60-264365 | 12/1985 |
| JP | 63-95159 | 4/1988 |
| JP | 63-315580 | 12/1988 |
| JP | 1-145377 | 6/1989 |
| JP | 1-258715 | 10/1989 |
| JP | 3-232778 | 10/1991 |
| JP | 03-232779 | * 10/1991 |
| JP | 03232779 | 10/1991 |
| JP | 4-100505 | 4/1992 |
| JP | 4-187578 | 7/1992 |
| JP | 5-139861 | 6/1993 |
| JP | 6-182228 | 7/1994 |
| JP | 06-182228 | 7/1994 |

(56) References Cited

FOREIGN PATENT DOCUMENTS

| | | | |
|---|---|---|---|
| JP | 7-196370 | | 8/1995 |
| JP | 9-202671 | | 8/1997 |
| JP | 2000-16872 | | 1/2000 |
| JP | 2001-97776 | | 4/2001 |
| JP | 2002-201082 | | 7/2002 |
| JP | 2002-224516 | | 8/2002 |
| JP | 2002-274947 | | 9/2002 |
| WO | WO-03044338 | * | 5/2003 |
| WO | 2005/037405 | | 4/2005 |
| WO | 2005-037406 | | 4/2005 |
| WO | 2005/044422 | | 5/2005 |
| WO | 2005/044425 | | 5/2005 |
| WO | 2005/047210 | | 5/2005 |

OTHER PUBLICATIONS

Glossary Metal Working Terms, p. 305, Published Jan. 2003, http/://books,google.com/books?id=6zTREw5IVrjMC&pg=PP1&lpg=PP1&dq=fusion+bonded+and+polycrystalline&output=html&sig=flAOJhGtKRTkqCY__Pm6ErL0Bc.

Guo et al (Ingenta Connect), Journal of Material Science, vol. 32, No. 19, Dec. 1, 1997.

* cited by examiner

Section view at A-A line

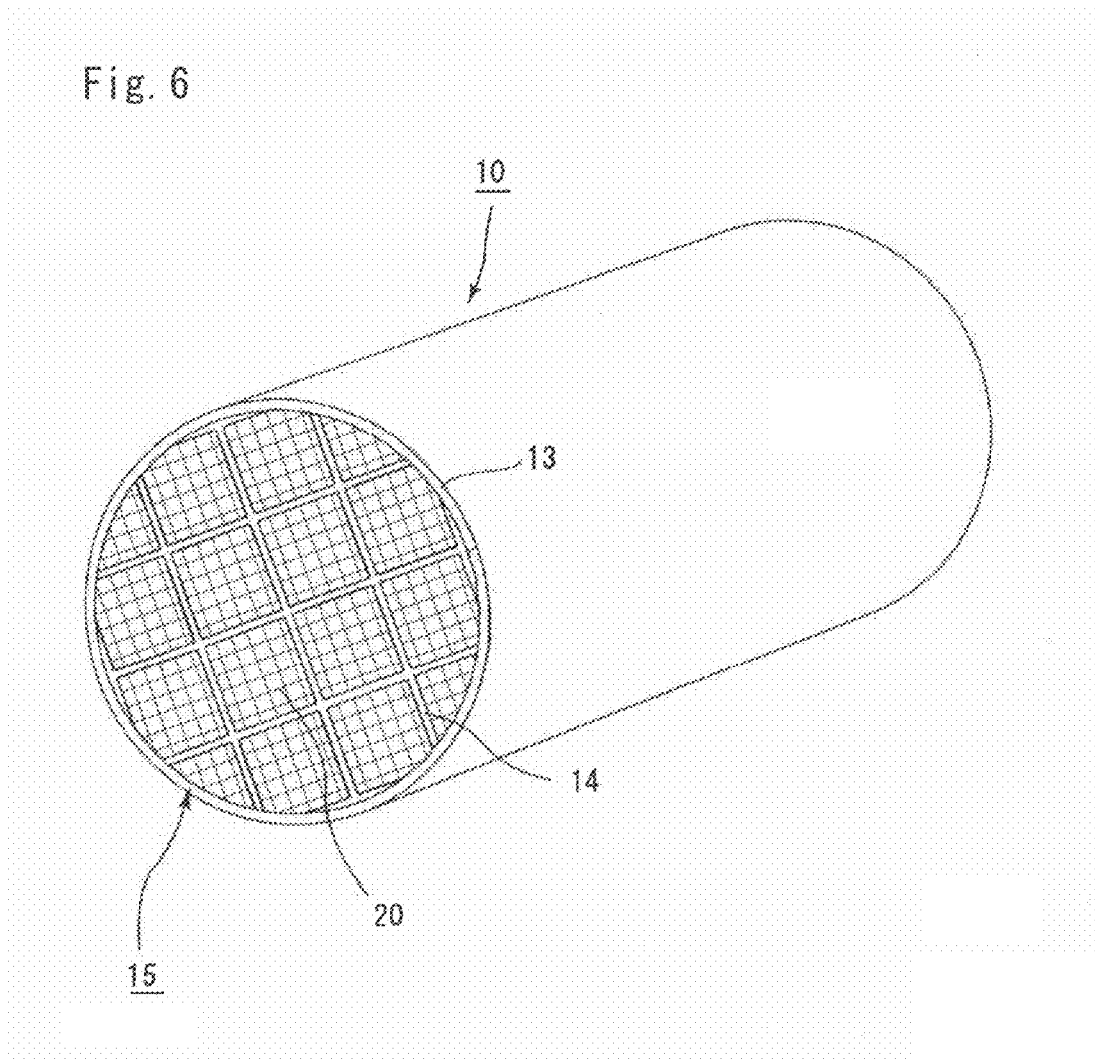

Section view at B-B line

32 Plugging material

CERAMIC SINTERED BODY AND CERAMIC FILTER

CROSS REFERENCE

This application is a Continuation Application of and claims the benefit of priority under 35 U.S.C. §120 from U.S. application Ser. No. 10/541,462, filed Jul. 6, 2005, now abandoned the entire contents of which are incorporated herein by reference. U.S. application Ser. No. 10/541,462 is the National Stage Application of PCT/JP04/13705, filed Sep. 13, 2004, and claims the benefit of priority under 35 U.S.C. §119 from Japanese Patent Application No. 2003-361229 filed Sep. 12, 2003.

TECHNICAL FIELD

This invention relates to a ceramic sintered body and a ceramic filter produced by using the ceramic sintered body, and more particularly to a ceramic filter used for removing particulates discharged from an internal combustion engine such as a diesel engine or the like. Moreover, a catalyst can be carried on the ceramic filter.

BACKGROUND ART

It has been pointed out that the exhaust gas discharged from internal combustion engines in vehicles such as buses or trucks, construction machines and the like contains a large number of fine particulates, and causes a harmful effect on environment and the human body. Therefore, it has been required to remove and purify the particulates. In order to fulfill such requirement, a filter for purifying the exhaust gas, for example, a filter with a honeycomb structure comprising porous ceramics has been developed.

FIG. 6 is an example of the conventional ceramic filter with a honeycomb structure. The conventional filter is constituted with a cylindrical-shaped honeycomb structural body 30 formed by arranging a plurality of cells 31 as an exhaust gas path side by side in the longitudinal direction through cell walls 33.

As shown in FIG. 6(b), the cells 31 are plugged at either one end portions of inlet side or outlet side for the exhausted gas with plugging materials 32, in which the exhaust gas flown into certain cells 31 passes through the cell walls 33 separating these cells 31 and flows out from another cells 31.

When such a ceramic structural body 30 is placed in an exhaust path of an internal-combustion engine, particulates in the exhaust gas discharged from the internal-combustion engine are caught by the cell walls 33 when passing through the honeycomb structural body 30, and as a result, the purification of the exhaust gas is conducted.

As a filter material for such a honeycomb structural body may have hitherto been used oxides such as cordierite and the like, carbides and the like. Among them, silicon carbide has advantages that it is excellent in the thermal conductivity, heat resistance, mechanical properties, chemical resistance and the like.

For instance, JP-A-S60-264365 discloses a porous silicon carbide sintered body having a three-dimensional net-like structure mainly composed of plate crystals with an average aspect ratio of 2-50.

JP-A-H04-187578 discloses a method of producing a porous silicon carbide sintered body by mixing α-type silicon carbide powder having a mean particle size of 0.3-50 μm and β-type silicon carbide powder having a mean particle size of 0.1-1.0 μm to form raw powder and firing the raw powder.

JP-A-H05-139861 discloses a method of producing a β-type porous silicon carbide sintered body by mixing silicon carbide powder having a mean particle size of 0.5-100 μm and β-type polycrystalline silicon carbide powder having a mean particle size of 0.1-5 μm to prepare raw powder and firing the raw powder.

JP-A-H06-1822282 discloses a method of producing a catalyst carrier by shaping and firing silicon carbide powder having a specific surface area of 0.1-5 $m^2/gr$ and impurity components of 1.0-5%.

JP-A-H09-202671 discloses a method of producing a silicon carbide honeycomb filter by mixing α-type silicon carbide powder having a mean particle size of 0.3-50 μm, β-type silicon carbide powder having a mean particle size of 0.1-1.0 μm and the like to form raw powder and firing it.

JP-A-2000-16872 discloses a method of producing a porous silicon carbide sintered body by mixing α-type silicon carbide powder having a mean particle size of 5-100 μm and α-type or β-type silicon carbide powder having a mean particle size of 0.1-1.0 μm to form a mixture and firing it.

JP-A-2001-97776 discloses a porous silicon carbide sintered body and the like wherein silicon carbide crystal particles constituting a porous structure are connected to each other through neck portions and the neck portion smoothly curves.

Generally, a filter for purifying the exhaust gas is subjected to a regeneration treatment in order to burn and remove particulates after catching a certain amount of particulates. However, when a filter made of silicon carbide is subjected to the regeneration treatment, large cracks may be generated in the filter itself due to thermal stress generated in the regeneration treatment. The filter having the cracks has a problem that the exhaust gas leaks out from the cracks and the catching of the particulates becomes incomplete after a long-term use of the filter. Such cracks can occur across silicon carbide particles and cause breakage of the filter.

Further, JP-A-2002-201082 discloses a porous honeycomb structural body for a filter including fire-resistant particles such as silicon carbide particles and the like, and metallic silicon. In such a honeycomb structural body, a catalyst is carried which acts to lower activate energy for the combustion of particulates or conversion harmful gas components such as CO, HC, $NO_x$ and the like. Further, as the degree of dispersion to the honeycomb structural body becomes higher, the reaction site to the particulates and the harmful gas components increases and the activity also increases. At a high temperature, however, the specific surface area of the catalyst carrier used for increasing the dispersion degree of the catalyst such as alumina and the like decreases and the sintering of the catalyst itself is caused. Consequently, it is known that the dispersion degree gets worse. Besides, in such a honeycomb structural body, the thermal conductivity is low as compared with the honeycomb structural body made only of silicon carbide, so that when the same amount of particulates is burnt at the regeneration treatment, the activity of the catalyst carried may decrease because heat from burning portions of particulates on surfaces of cells and the like is hard to disperse and the temperature of the burning portions becomes extremely high. Therefore, in the honeycomb structural body including heat-resistant particles and metallic silicon, visible-size cracks may be generated at the regeneration treatment.

It is an object of the invention to solve the above problems inherent to the conventional techniques, and to provide a ceramic sintered body having a long-term stability which can prevent cracks from occurring due to the breakage of ceramic particles when thermal stress is applied and catalyst carried from deteriorating when thermal stress is repeatedly applied, and a ceramic filter produced by using the ceramic sintered body.

DISCLOSURE OF THE INVENTION

The invention is a ceramic sintered body comprising ceramic coarse particles and a bonding layer existing between the ceramic coarse particles to connect the particles and including ceramic fine particles having a mean particle size smaller than that of the ceramic coarse particles.

In this invention, the ceramic coarse particles are single-crystal.

Also, in the invention, the bonding layer is formed with ceramic fine particles having a mean particle size smaller than that of the ceramic coarse particles and/or a sintered body of aggregates thereof, or is a brittle body having a strength lower than that of the ceramic coarse particles, or is a polycrystal body comprising a plurality of the ceramic fine particles, and the ceramic fine particles are formed by sintering with the grain boundary remained, and contain at least one sintering aid selected from iron, aluminium, nickel, titanium, chromium, oxide, and further, the content of the sintering aids is higher than that in the ceramic coarse particles.

In the ceramic sintered body according to the invention, an average particle size ratio of the ceramic coarse particles to the ceramic fine particles is 15:1~1:200 and a ratio of the total weights of the ceramic coarse particles to the ceramic fine particles is 1:1~1:9.

Next, the invention proposes a honeycomb-structural ceramic filter comprising a pillar-shaped porous ceramic member or a combination of a plurality of the pillar-shaped porous ceramic members in which a plurality of cells as a gas passageway are arranged side by side in a longitudinal direction through cell walls and either one end portions of these cells are plugged, characterized in the filter itself is formed by a ceramic sintered body comprising ceramic coarse particles and a bonding layer existing between the ceramic coarse particles to connect the particles and including ceramic fine particles having a mean particle size smaller than that of the ceramic coarse particles.

In the ceramic filter according to the invention, the concrete structures of the ceramic coarse particles and the bonding layer are the same as described in the ceramic sintered body, and therefore detailed explanation is omitted.

As ceramic used in the invention may be mentioned, for example, alumina, zirconia, mullite, silica, cordierite and the like.

As the nitride ceramics may be mentioned, for example, aluminium nitride, silicon nitride, boron nitride, titanium nitride and the like.

As the carbide ceramics may be mentioned, for example, silicon carbide, zirconium carbide, titanium carbide, tantalum carbide, tungsten carbide and the like.

These ceramics may be used alone or in a combination of two or more.

In the invention, the ceramic sintered body is preferable to use silicon carbide as the ceramic coarse particle and the bonding layer. Further, the ceramic is preferable to show two peaks of particle size according to a particle size distribution of particles (vertical axis: number of particles, horizontal axis: particle size) and have an average particle size of not less than 30 µm.

Further, the ceramic sintered body is preferable to be a porous body.

Hereinafter, as the ceramic sintered body according to the invention, there is explained a case of mainly using silicon carbide. The ceramic sintered body may be referred to as silicon carbide sintered body, the coarse particles comprising silicon carbide may be referred to as silicon carbide coarse particles, and the ceramic fine particles may be referred to as silicon carbide fine particles in the following explanation.

Further, the honeycomb structural body as the feature of the structure of the ceramic filter according to the invention is a pillar-shaped body formed by arranging a plurality of cells as an exhaust gas passageway side by side in the longitudinal direction through cell walls. There are both one-piece type and aggregate type honeycomb structural bodies. Hereinafter, the one-piece type honeycomb structural body having an integrated structure is formed independently as a whole, while the aggregate type honeycomb structural body has a structure that a plurality of ceramic sintered bodies (units) are united through sealing material layers.

The ceramic filter of the invention is preferable to be formed by using the above aggregate type honeycomb structural bodies using the silicon carbide sintered bodies.

In the ceramic filter having the aggregate type honeycomb structure, it is preferable that the sealing material layers are formed not only between the units but also on the outer peripheral surface and that an adhesive having adhesion function is used as the sealing material layer.

The ceramic sintered body of the invention having the structure explained above, that is, the silicon carbide sintered body is characterized in that mean particle size ratio of the silicon carbide coarse particles to the silicon carbide fine particles is adjusted to be 15:1~200:1 and the ratio of the total weights thereof is adjusted to be 1:1~9:1 and that the bonding layer comprising silicon carbide fine particles and/or a polycrystalline body made of the silicon carbide fine particle group is interposed between the silicon carbide coarse particles, whereby the bonding layer can develop the function of mitigating the aforementioned thermal shock and efficiently prevent cracks from occurring in the sintered body.

Further, in the silicon carbide sintered body, by adjusting a mean particle diameter of the silicon carbide coarse particle to not less than 30 µm, the number of the bonding layers is decreased, while the number of the silicon carbide fine particles per the bonding layer is increased, so that it is possible to sufficiently ensure the thickness of the layer comprising the polycrystalline bodies constituted with the silicon carbide fine particles and/or the silicon carbide fine particle group (bonding layer) to effectively act on the mitigation of the thermal shock as described above. Moreover, the bonding layer means bonding portions wherein the silicon carbide coarse particles are connected to each other through the polycrystalline body comprising at least one silicon carbide fine particle and/or a group thereof.

In the ceramic filter according to the invention produced by using the silicon carbide sintered body, the whole of the honeycomb structural body can be enclosed and compressed by an action of the sealing material layer, and it becomes possible to efficiently prevent minute cracks generated by impact, thermal stress and the like from growing to be a visible size and silicon carbide particles from shedding accompanied with the occurrence of cracks.

In the aggregate type ceramic filter integrated by using the silicon carbide sintered bodies and combining a plurality of the honeycomb bodies prepared by these sintered bodies through the sealing material layer, there are advantages in reducing thermal stress and improving heat resistance by said sealing material layer, and adjusting the size freely by increasing and decreasing the number of the honeycomb structural bodies, whereby it becomes possible to catch particulates and the like in the exhaust gas more efficiently by the cell walls separating the cells.

Further, by utilizing the ceramic filter of the invention as the exhaust gas purifying apparatus for vehicles, it is possible to catch particulates in the exhaust gas completely for long periods, reduce the deterioration of a catalyst when it is carried, prevent the breakage of the filter since minute cracks generated by impact, thermal stress or the like do not grow to be a visible size, prevent silicon carbide particles from shedding accompanied with the occurrence of cracks, improve its heat resistance, and adjust the size freely.

BRIEF DESCRIPTION OF THE DRAWINGS

FIG. 6 is a perspective view schematically showing an embodiment of the aggregate type honeycomb structural body using the silicon carbide sintered body according to the invention.

BEST MODE FOR CARRYING OUT THE INVENTION

Figure 1:
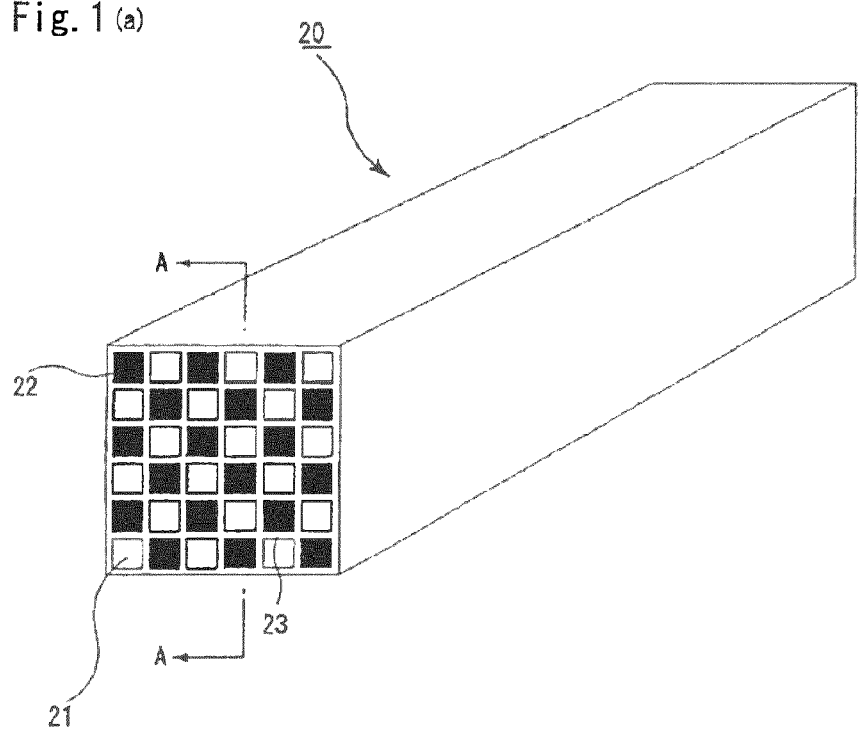
FIG. 1(a) is a perspective view schematically showing an embodiment of the one-piece type honeycomb structural body using the silicon carbide sintered body according to the invention.
FIG. 1(b) is a section view shown by an arrow A-A in FIG. 1(a).
Figure 1:
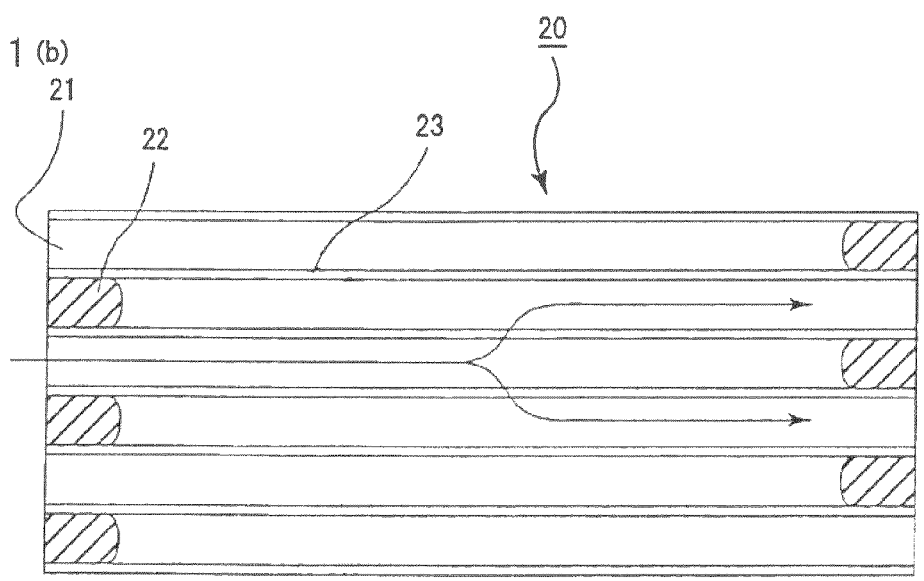

As a desirable embodiment of the ceramic sintered body having a honeycomb structural body, a ceramic filter 20 having one-piece type honeycomb structure using ceramic carbide (hereinafter referred to as one-piece type honeycomb filter) is shown in FIG. 1. The one-piece type honeycomb filter 20 is a square-pillar shaped porous body having a plurality of cells 21 arranged side by side in its longitudinal direction through cell walls 23. These cells 21 are plugged at either one end portions of inlet side or outlet side of the exhaust gas with a sealing materials 22 to function the cell walls 23 separating the cell 21 as a filter. That is, the exhaust gas flown into one cell 21 always passes the cell wall 23 and thereafter flows out of another cell 21.

Figure 2:
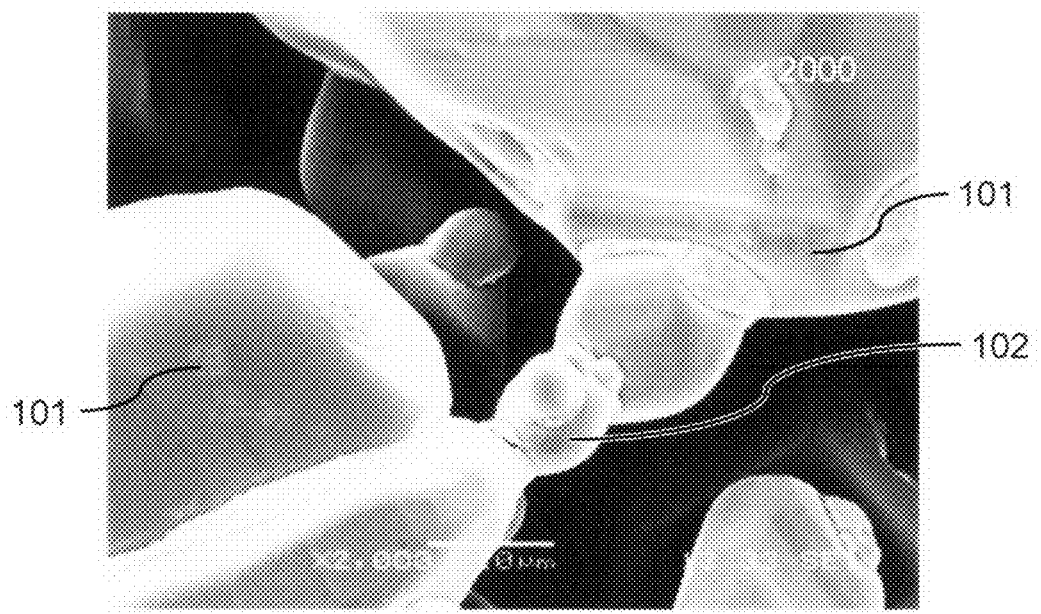
FIG. 2 is a SEM photograph of the silicon carbide sintered body according to the invention showing an embodiment of a state of bonding silicon carbide coarse particles and silicon carbide fine particles (Example 10).
Figure 3:
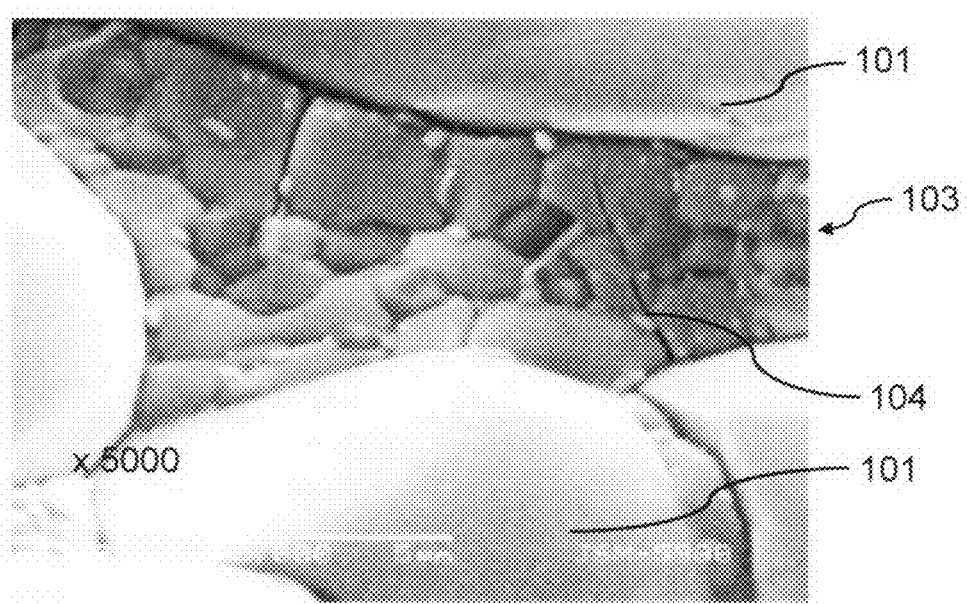
FIG. 3 is a SEM photograph of the silicon carbide sintered body according to the invention showing an another embodiment of a state of bonding silicon carbide coarse particles and silicon carbide fine particles (Reference Example 1).

The one-piece type honeycomb filter 20 itself, especially the cell wall 23 is formed by porous sintered bodies constituted with ceramic carbide coarse particles 101 each having a large particle size and a bonding layer comprising ceramic carbide fine particles 102 each having a small particle size and/or aggregates thereof. That is, as shown in FIG. 2 and FIG. 3, the one-piece type honeycomb filter has a structure that silicon carbide coarse particles 101 are connected to each other through polycrystal body 103 (bonding layer) made of silicon carbide fine particles 102 and/or the aggregates formed by a group of the silicon carbide fine particles 102.

In such a one-piece type honeycomb filter 20, thermal stress generated in the regeneration treatment and the like is mitigated by the role of the bonding layer comprising the silicon carbide fine particle 102 and/or the polycrystal body 103 as described above. Although the mechanism of the mitigation is not clear, it can be considered as follows: For example, if a fine crack 104 which can be hardly observed until SEM and the like as shown in FIG. 3 is generated in the bonding layer comprising the polycrystal body 103, this crack is transmitted to the silicon carbide coarse particle 101 as a skeleton particle to prevent the crack from growing to be a visible large size. It is considered that, in the bonding layer formed by the polycrystal body 103 comprising the silicon carbide fine particles 102 and/or the aggregates thereof, the silicon carbide fine particles 102 complicatedly bind together in random directions. Therefore, in the one-piece type honeycomb structural body 20, particulates in the exhaust gas can be surly caught continuously after the regeneration treatment or the like.

Further, the bonding layer formed by the polycrystal body 103 comprising groups of the silicon carbide fine particles 102 shows a property as a ceramic joint body having adhesion and bonding function or a ceramic brittle body that has smaller strength and is easily broken as compared with the ceramic coarse particles. The ceramic joint body or the ceramic brittle body is formed by aggregating the silicon carbide fine particles 102 to a polycrystalline condition with keeping the particle form. Therefore, it can be distinguished from an aggregate formed by fusing the silicon carbide fine particles 102 without maintaining the particle form as observed by using the transmission electronic microscope (TEM).

Furthermore, it is desirable that a metal such as iron, aluminium, nickel, titanium, chromium or the like, or a metal oxide thereof is included in the interface of the fine particles forming the bonding layer.

They are considered to work as a sintering aid for ceramic, and further have an action for mitigating the stress. In other words, the metal is easy to be melted because the melting point is iron: 1540° C., aluminium: 660° C., nickel: 1450° C., titanium: 1660° C., and chromium: 1860° C., while the melting point of ceramic is approximately 2000° C. As a result, in the case of using as a filter, at the high temperature where the biggest thermal stress is exerted, that is, when the ceramic brings about the thermal expansion and the like, the metal is melted to be like an elastic body to mitigate the stress between ceramic particles or form gaps between the ceramic particles, whereby the compression force between the ceramic particles is mitigated, and hence the stress can be mitigated.

Further, when the fine particle is especially carbide ceramics or nitride ceramics, it is preferable that grain boundary is an oxide ceramic (e.g. silica). It is considered that since oxide ceramics has lower thermal conductivity than carbide ceramics or nitride ceramics, heat insulation effect partly appears compared to the bonding layer made only of carbide ceramics or nitride ceramics, and rapid temperature hardly occurs to mitigate thermal stress. The oxide ceramics sometimes work as a substance for inhibiting the firing.

In the invention, the silicon carbide coarse particles 101 as a skeleton particle of the ceramic sintered body have a mean particle size larger than that of the silicon carbide fine particles 102. The preferable lower limit is 30 μm and the preferable upper limit is 70 μm. When the mean particle size is less than 30 μm, the number of the bonding layers increases to make the thickness too thin and hence stress can not be sufficiently mitigated in the bonding layer. While, when the mean particle size exceeds 70 μm, the number of the bonding layers decreases and it is difficult to form the bonding layer thickly, and as a result, the strength of the honeycomb structural body 20 lowers and the figures cannot be maintained. In addition, when it exceeds 70 μm, defective forming may be caused in the forming and production process.

In the invention, the silicon carbide fine particles 102 constituting the bonding layer of the ceramic sintered body have a mean particle size smaller than the silicon carbide coarse particles 101. The preferable lower limit is 0.1 μm and the preferable upper limit is 2.0 μm. When the means particle size is less than 0.1 μm, it is considered that the bonding layer is incorporated into the coarse particles and the bonding layer can not easily be formed since the sintering of the silicon carbide fine particles is promoted. Further, the cost for producing the silicon carbide fine particles 102 increases to bring about cost up. On the other hand, when the mean particle size exceeds 2.0 μm, it is difficult to form the bonding layer by the silicon carbide fine particles 102 and stress cannot be effectively mitigated in the bonding layer.

The preferable lower limit of the mean particle size ratio of the silicon carbide coarse particles 101 to the silicon carbide fine particles 102 (mean particle size of the silicon carbide coarse particles 101/mean particle size of the silicon carbide fine particles 102) is 15 times, and the preferable upper limit is 200 times. When the ratio is less than 15 times, the formation of bonding portion by the silicon carbide fine particles 102 is difficult and stress can not be sufficiently mitigated in the bonding layer. While when the ration exceeds 200 times, the strength of the one-piece type honeycomb structural body 20 extremely lowers to easily break down due to vibration during the production or use when being mounted on vehicles and the like.

The preferable lower limit of the ratio of the total weights of the silicon carbide coarse particles 101 to the silicon carbide fine particles 102 (total weight of the silicon carbide coarse particles 101/total weight of the silicon carbide fine particles 102) is 1 times, and the preferable upper limit is 9 times. When the ratio is less than 1 times, since the rate of silicon carbide fine particles 102 is high, aggregated portion of the silicon carbide fine particles 102 is formed in addition to the bonding layer and thereby densified to hardly be porous. Also, since thermal stress is concentrated into the portion, it is considered that the one-piece type honeycomb structural body 20 is easily broken. On the other hand, when the ratio exceeds 9 times, since the rate of silicon carbide fine particles 102 is low, it is difficult to form the bonding layer by the silicon carbide fine particles 102 and stress can not be sufficiently mitigated in the bonding layer.

As the sealing material 22 for plugging the end portions of the cells 31, it is desirable to use the same porous ceramic as the cell walls 23. Because the adhesion strength between the both becomes high and also the porosity of the sealing material 22 is adjusted likewise the cell walls 23, whereby the thermal expansion coefficient of the cell walls 23 can be matched with the thermal expansion coefficient of the sealing material 22. As a result, it is made possible to prevent the formation of a gap between the sealing material 22 and the cell walls 23 due to thermal stress in the production or use, and the occurrence of cracks in the sealing material 22 or the cell wall 23 contacted therewith.

The one-piece type honeycomb filter 20 can be carried with a catalyst for decreasing activation energy for the combustion of the particulates or converting harmful components such as CO, HC, $NO_x$ or the like in the exhaust gas. That is, the one-piece type honeycomb filter 20 carried on surfaces of the cell walls 23 and the like with the catalyst works not only as a filter for catching particulates in the exhaust gas, but also as a catalyst converter for converting CO, HC, $NO_x$ or the like contained in the exhaust gas.

The one-piece type honeycomb filter 20 uses mainly the silicon carbide coarse particles 101 and silicon carbide fine particles 102 as a starting material and shows a high thermal conductivity. Therefore, the maximum temperature inside the filter in the regeneration treatment does not rise as compared to the conventional honeycomb structural body formed by joining silicon carbide particles inferior in thermal conductivity through metallic silicon, and the activity of the catalyst is not lowered.

As the catalyst carried in the honeycomb filter 20 may be used any ones which can lower the activation energy for the combustion of particulates or conversion harmful components such as CO, HC, $NO_x$ and the like in the exhaust gas. For example, a noble metal such as platinum, palladium, rhodium or the like can be used. Particularly, a so-called three-way catalyst consisting of platinum, palladium and rhodium is preferable. In addition to the noble metal, it is desirable to use an alkali metal (Group 1 of the Periodic Table), an alkaline earth metal (Group 2 of the Periodic Table), a rare earth element (Group 3 of the Periodic Table), a transition metal element and the like.

The catalyst may be carried on the surfaces of pores in the honeycomb filter 20, or may be uniformly carried on the cell walls 23 at a given thickness. Also, the catalyst may be uniformly carried on the surfaces of cell walls 23 and/or pores or unevenly carried at certain side. In particular, it is desirable to carry the catalyst on the surfaces of cell walls 23 or on the surfaces of pores in the vicinity thereof in the cells 21 at inflow side. It is more desirable to carry the catalyst on the both surfaces, because the catalyst can easily contact with the particulates to conduct combustion of the particulates efficiently.

When the catalyst is applied to the honeycomb filter 20, it is desirable to coat the surface of the honeycomb structural body with a support material such as alumina or the like prior to the application of the catalyst. Because, it is possible to make the specific surface area of the honeycomb structural body large to enhance the dispersivity of the catalyst and increase the reaction site of the catalyst. Also, the support material can prevent the sintering of catalyst metal and thereby the heat resistance of the catalyst can be improved to decrease the pressure loss.

The one-piece type honeycomb structural body carried with the catalysts functions as the same exhaust gas purifying apparatus as the known DPF (diesel particulate filter) equipped the with catalyst. Meanwhile, detailed explanation for the case when the one-piece type honeycomb structural body according to the invention functions as a catalyst-carrying body is omitted here.

The one-piece type honeycomb structural body 20 shown in FIG. 1 is square-pillar shaped. However, the shape of the one-piece type honeycomb structural body according to the invention is not especially limited as far as it is pillar-shaped body, and mention may be made of, for example, a pillar-shaped body which cross section is polygonal, circular, or ellipsoidal as a shape of a section perpendicular to a longitudinal direction.

The porosity of the silicon carbide honeycomb structural body constituting the one-piece type honeycomb filter 20 is not particularly limited, but the lower limit is desired to be 30% and the upper limit is desired to be 80%. When the porosity of the structural body is less than 30%, the honeycomb filter 20 may be clogged easily, while when it exceeds 80%, the strength of the one-piece type honeycomb filter 20 lowers to be broken easily. Moreover, the porosity can be measured by the well-known methods, such as mercury injection method, Archimedes method, measurement through scanning electron microscope (SEM) and the like.

The average pore diameter of the one-piece type honeycomb filter 20 is preferably not more than 5 μm, while the upper limit is not more than 50 μm. When it is less than 5 μm, the particulates easily cause clogging, while when it exceeds 50 μm, the particulates can pass through the pores and the catching efficiency of the particulates lowers to impede the functioning as a filter.

Although the illustration is omitted, in the one-piece type honeycomb filter according to the invention, it is desirable to form a sealing material layer on an outer peripheral surface thereof.

Such a one-piece type honeycomb filter may have a sealing material layer formed on an outer peripheral surface thereof. Because, when the sealing material layer is formed on the outer peripheral surface of the honeycomb structural body, it is effective to bundle the one-piece type honeycomb filter through the sealing material layer, whereby there can be prevented fine cracks growing to be visible size due to impact, further thermal stress or the like and silicon carbide powders from shedding accompanied with the occurrence of the cracks.

As a material constituting the sealing material layer can be used, for example, a sealing material consisting of an inorganic binder, an organic binder, inorganic fibers and/or inorganic particle, and the like.

As the inorganic binder, mention may be made of, for example, silica sol, alumina sol and the like. They may be used alone or in a combination of two or more. Among the inorganic binders, silica sol is desirable.

As the organic binder, mention may be made of, for example, polyvinyl alcohol, methyl cellulose, ethyl cellulose, carboxymethyl cellulose and the like. They may be used alone or in a combination of two or more. Among the organic binders, carboxymethyl cellulose is desirable.

As the inorganic fiber, mention may be made of, for example, ceramic fibers such as silica-alumina, mullite, alumina, silica and the like. They may be used alone or in a combination of two or more. Among the inorganic fibers, silica-alumina fiber is desirable.

As the inorganic particles, mention may be made of, for example, carbides, nitrides and the like. Concretely, there may be mentioned inorganic powder or whisker consisting of silicon carbide, silicon nitride, boron nitride and the like. They may be used alone or in a combination of two or more. Among the inorganic particles, silicon carbide having an excellent thermal conductivity is desirable.

Next, as the ceramic filter according to the invention, mention may be made of an aggregate type ceramic filter constituted by bundling a plurality of ceramic filters through adhesive sealing material layers, in addition to the one-piece type ceramic filter consisting only of one ceramic filter as mentioned above.

Such an aggregate type ceramic filter is a preferable embodiment in that the sealing material layer can mitigate thermal stress to improve the heat resistance of the filter, the number of the ceramic structural bodies can be increased and decreased as a unit to freely adjust the size. Moreover, the one-piece type honeycomb filter has the same filter function as the aggregate type honeycomb filter.

Figure 4:
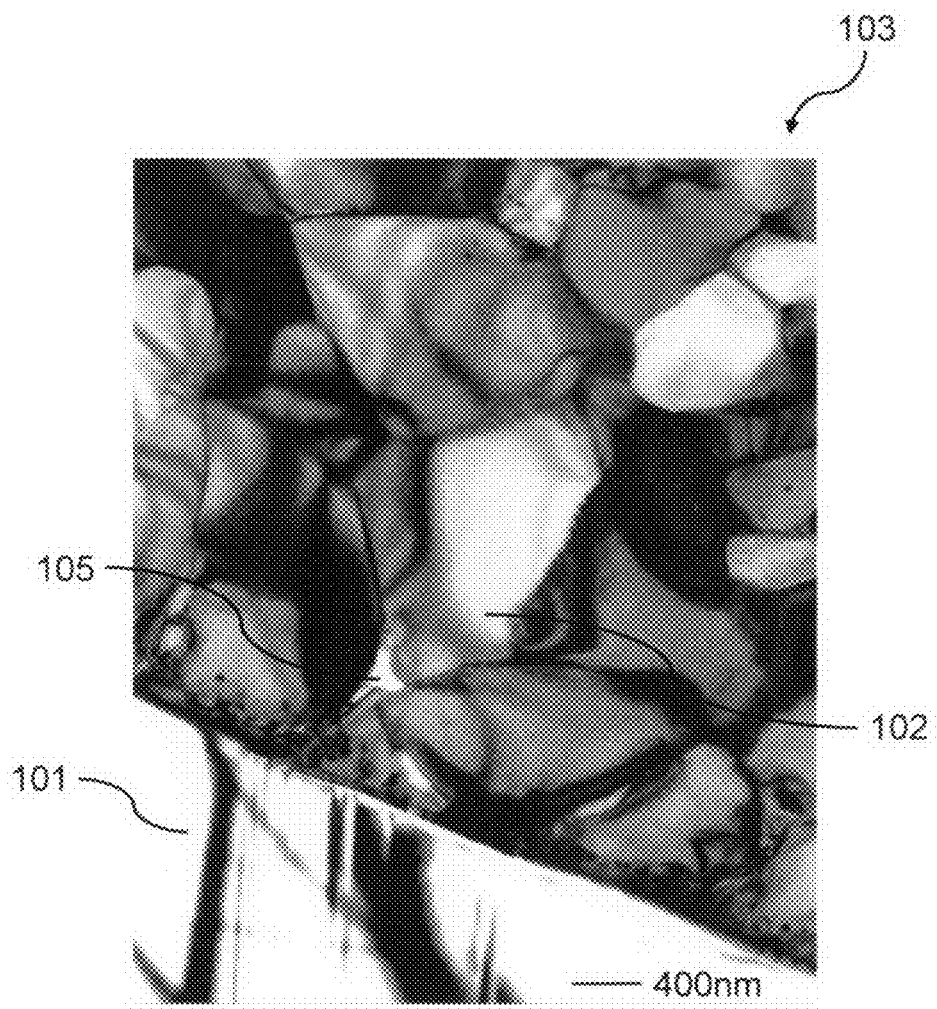
FIG. 4 is a TEM photograph of the silicon carbide sintered body according to the invention showing a crystal condition of a cross section of the combined state in Referenced Example 1.

FIG. 4 shows another embodiment of the invention and is a perspective view showing an aggregate type honeycomb filter constituting by bundling a plurality of units of ceramic (silicon carbide) sintered bodies of honeycomb structural bodies through sealing material layers. As shown in the figure, the aggregate type honeycomb filter 10 is used as an exhaust gas purification filter and formed by bundling a plurality of the above units with honeycomb structure through sealing material layers 14 in a cylindrical shape to constitute a honeycomb block 15 and further coating another sealing material layers 13 around the honeycomb blocks 15 in order to prevent leakage of the exhaust gas.

In the aggregate type honeycomb filter 10, the sealing material layer 14 is inserted between ceramic honeycomb structural body units 20 and functions as an adhesive bundling and adhering a plurality of the ceramic honeycomb structural body units. On the other hand, it is preferable that the sealing material layer 13 is formed so as to enclose an outer peripheral surfaces of the honeycomb block 15 as an aggregate body of the units, and functions as a sealing material for preventing leakage of the exhaust gas passing through the cells from the outer peripheral surface of the honeycomb block 15 when the aggregate type honeycomb filter 10 is disposed in an exhaust path of an internal combustion engine, and be made from a material hardly permeating gas as compared with the ceramic sintered body itself.

In the aggregate type honeycomb filter 10, the sealing material layers 13 and 14 may be made of the same material, or different materials. Further, when the sealing material layers 13 and 14 are made of the same material, the compounding ratio of the materials can be the same or different.

However, the sealing material layer 14 may be made of a porous material capable of flowing the exhaust gas, but it is preferable to be made of a densified material. On the other hand, the sealing material layer 13 is preferable to be made of a densified material. Because, the sealing material layer 13 is used for the purpose of preventing the leakage of the exhaust gas from the outer peripheral surface of the honeycomb block 15 when the aggregate type honeycomb filter 10 is disposed in an exhaust path of an internal combustion engine.

As a material constituting the sealing material layer 13 and the sealing material layer 14 can be used, for example, material prepared by compounding the above-mentioned inorganic binder, organic binder, inorganic fibers and/or inorganic particles.

The aggregate type honeycomb filter 10 may have a cylindrical shape, but as far as it is pillar-shaped, the cross section vertical to a longitudinal direction can be, for example, polygonal, circular, or ellipsoidal.

The aggregate type honeycomb filter 10 can be prepared by bundling a plurality of honeycomb structural body units and then forming the outer peripheral surface into a polygonal, circular, ellipsoidal shape or the like, or by previously working the shape of cross section of the honeycomb structural body units, and then bundling them through an adhesive so as to make the shape of cross section vertical to a longitudinal direction polygonal, circular, ellipsoidal or the like. For example, the aggregated type honeycomb filter may be a cylindrical-shaped aggregate type honeycomb filter prepared by bundling 4 pillar-shaped one-piece type honeycomb structural body wherein the shape of cross section vertical to a longitudinal direction polygonal is fan-shape formed by dividing a circle in quarters.

Next, an example of the method of manufacturing the honeycomb filter using the silicon carbide sintered body according to the invention is explained.

When the honeycomb structural body is a one-piece type honeycomb filter constituted by a single silicon carbide sintered body (honeycomb structural body unit) as a whole, a starting material paste consisting mainly of the aforementioned silicon carbide coarse particles and silicon carbide fine particles is extrusion-molded to form a silicon carbide green shaped body having substantially the same shape as a desired one-piece type honeycomb filter.

The starting material paste is not especially limited, but it is desirable to use materials wherein the porosity of the ceramic member after the production is made 30-80%, and there can be used, for example, one obtained by adding a binder, a dispersion medium and the like to the aforementioned silicon carbide coarse particles and silicon carbide fine particles.

As the binder can be used, for example, methyl cellulose, carboxy methyl cellulose, hydroxy ethyl cellulose, polyethylene glycol, phenol resin, epoxy resin and the like. The compounding amount of the binder is usually desirable to be about 1-20 parts by weight per 100 parts by weight of the silicon carbide particle.

As the dispersion medium can be used, for example, an organic solvent such as benzene or the like, an alcohol such as methanol or the like, water and so on. The dispersion medium is compounded in a proper amount for making the viscosity of the starting material paste within a certain range.

The silicon carbide powder, binder and dispersing medium are mixed in an attritor or the like, sufficiently kneaded by means of a kneader or the like and then extrusion-molded.

The raw material paste may be added with a material obstructing firing and/or a sintering aids advancing firing. The average particle size, particle size distribution, and blending quantity of the material obstructing firing and the sintering aids are adjusted depending on the average particle size, particle size distribution, and blending quantity of the silicon carbide fine particles, whereby the ceramic shaped body of the ceramic honeycomb structural body after firing can be made to have a structure that the silicon carbide coarse particles are bonded with each other through the silicon carbide fine particles and/or the bonding layer comprising of polycrystal body formed by the silicon carbide particles.

Also, a shaping assistant may be added to the starting material paste, if necessary. As the shaping assistant can be used, for example, ethylene glycol, dextrin, aliphatic acid soap, polyvinyl alcohol and the like.

To the starting material paste may be added balloons of hollow microspheres composed mainly of oxide ceramic, spherical acryl particles, hole-forming agent such as graphite or the like, if necessary.

As the balloon can be used, for example, alumina balloon, glass microballoon, silas balloon, fly ash balloon (FA balloon), mullite balloon and the like. Among them, fly ash balloon is desirable.

Then, the ceramic shaped body is dried by using a microwave drying machine, a hot-air drying machine, a dielectric drying machine, a reduced-pressure drying machine, a vacuum drying machine, a freeze drying machine and the like to form a dried body, and thereafter the dried body is subjected to a plugging treatment in which given cells are filled with a sealing material paste as a sealing material and clogged at either end portions thereof.

The sealing material paste is not particularly limited, but it is desirable to use materials in which a porosity of a sealing material produced after a post-process is made within 30~80%. For example, the same material as in the aforementioned starting material paste can be used. The starting material paste is desirable to be a material prepared by adding a lubricant, a solvent, a dispersant, and a binder to the ceramic particles. The reason is that the settling of the silicon carbide particles in the sealing material paste in the plugging treatment can be prevented.

Next, the dried body of the silicon carbide shaped body filled with the sealing material paste is degreased and fired under given conditions to form a silicon carbide one-piece type honeycomb filter comprised of a porous sintered body as a whole.

As the conditions for decreasing the dried body may be used conditions conventionally applied in the production of filters comprising porous ceramics.

The conditions for firing the dried body are decided depending on the average particle size, particle size distribution, and blending quantity of the silicon carbide coarse particles, the silicon carbide fine particles, the material obstructing firing, the sintering aid advancing firing and the like, whereby the honeycomb structural body after the firing can have a structure that the silicon carbide coarse particles bond with each other through the bonding layer of polycrystal body formed by the silicon carbide fine particles and/or an aggregate body of the silicon carbide particles. Concretely, conditions of 1800-2200° C. and 3 hours or the like may be used.

When a catalyst is supported on the one-piece type honeycomb filter, it is desirable to form am alumina film having a high specific surface area on the ceramic fired body obtained by firing and provide a catalyst such as platinum or the like on the surface of the alumina film.

As a method for forming the alumina film on the surface of the silicon carbide sintered body, there are, for example, a method wherein a solution of a metal compound containing aluminum such as $Al(NO_3)_3$ or the like is impregnated in the silicon carbide sintered body and heated, a method wherein a solution containing alumina powders is impregnated in the silicon carbide sintered body and heated, and the like.

As a method for providing a co-catalyst or the like on the alumina film may be used, for example, a method wherein a solution of a metal compound containing a rare-earth element such as $Ce(NO_3)_3$ or the like is impregnated in the silicon carbide sintered body and heated.

As a method for providing a catalyst on the alumina film, may be used, for example, a method wherein a solution of dinitrodiamine platinum nitrate ($[Pt(NH_3)_2(NO_2)_2]HNO_3$) is impregnated in the ceramic fired body and heated.

Further, when the honeycomb structural body is an aggregate type honeycomb filter 10 constituted by bundling a plurality of the honeycomb units through the sealing material 14 as shown in FIG. 6, a step of applying a sealing material paste forming a sealing material layer 14 on the side of a honeycomb structural body unit at a uniform thickness and laminating other honeycomb structural body unit is successively repeated to prepare a laminate of square-pillar shaped aggregate type honeycomb structural body having a given size.

As the material constituting the sealing material paste is already explained and the explanation thereof is omitted here.

Next, the laminate of the honeycomb structural body units (aggregated body) is heated to dry and solidify the sealing material paste layer to thereby form a sealing material layer 14, and thereafter an outer peripheral portion thereof is cut into a shape as shown in FIG. 6 with a diamond cutter or the like to prepare a honeycomb block 15.

A sealing material layer 13 is formed on the outer periphery of the honeycomb block 15 with the above sealing material paste, whereby there can be produced an aggregate type honeycomb filter 10 constituted by bundling a plurality of the honeycomb structural body units through the sealing material layers 14.

Figure 7:
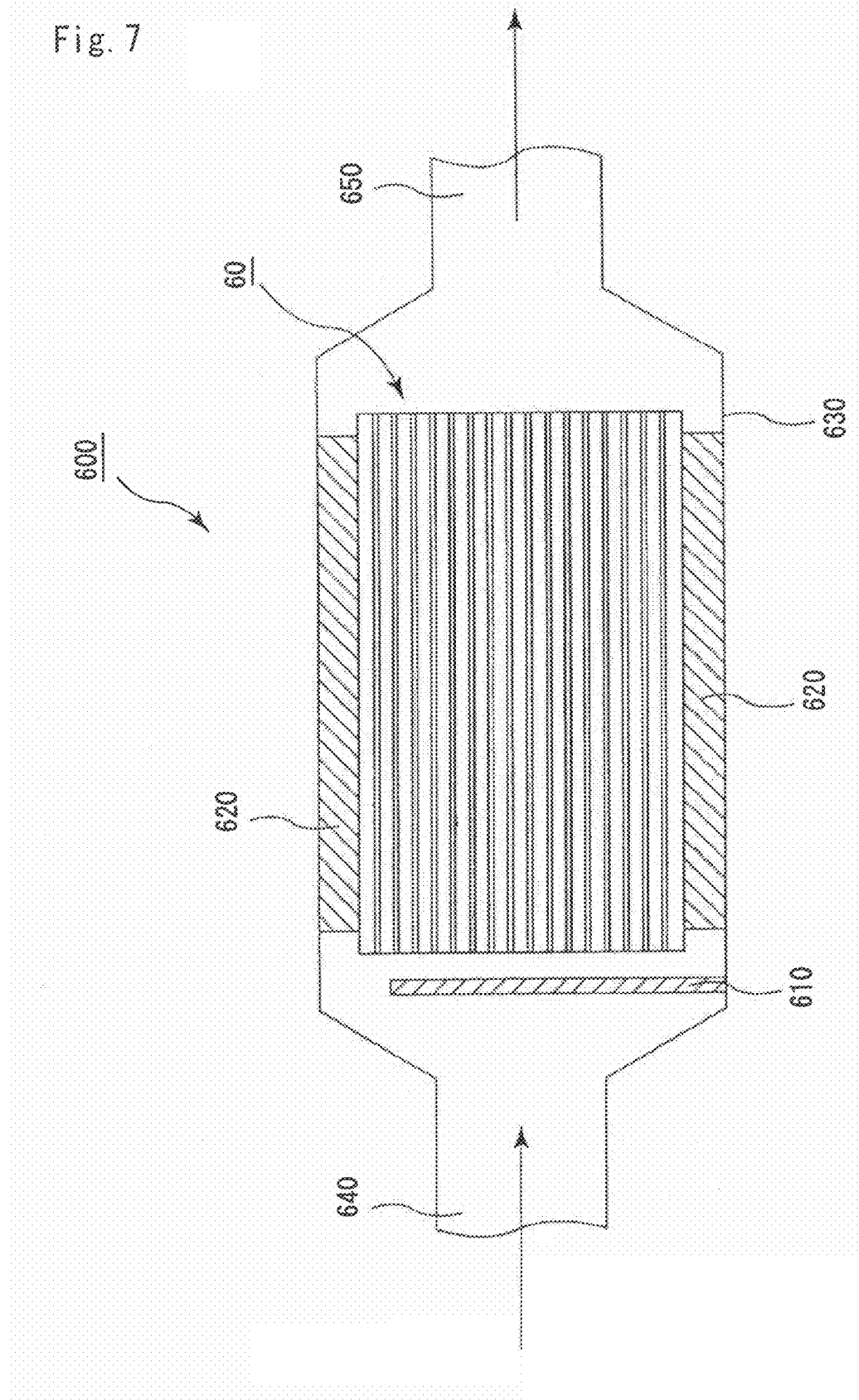
FIG. 7 is a section view illustrating an embodiment of an exhaust gas purifying apparatus for vehicles equipped with the ceramic filter according to the invention.
Figure 8A:
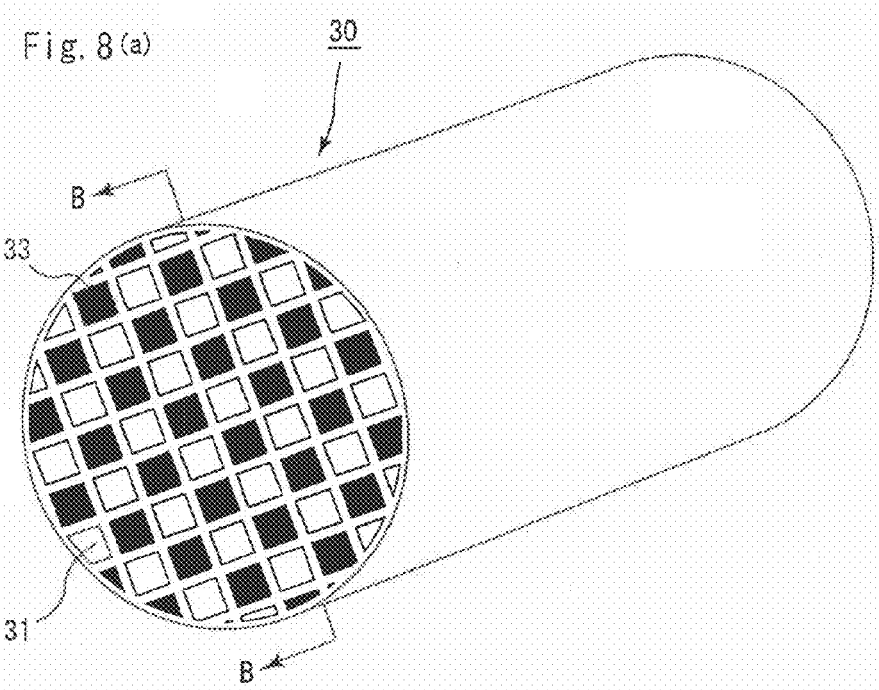
FIG. 8(a) is a perspective view illustrating an embodiment of the conventional honeycomb structural bodies.
Figure 8B:
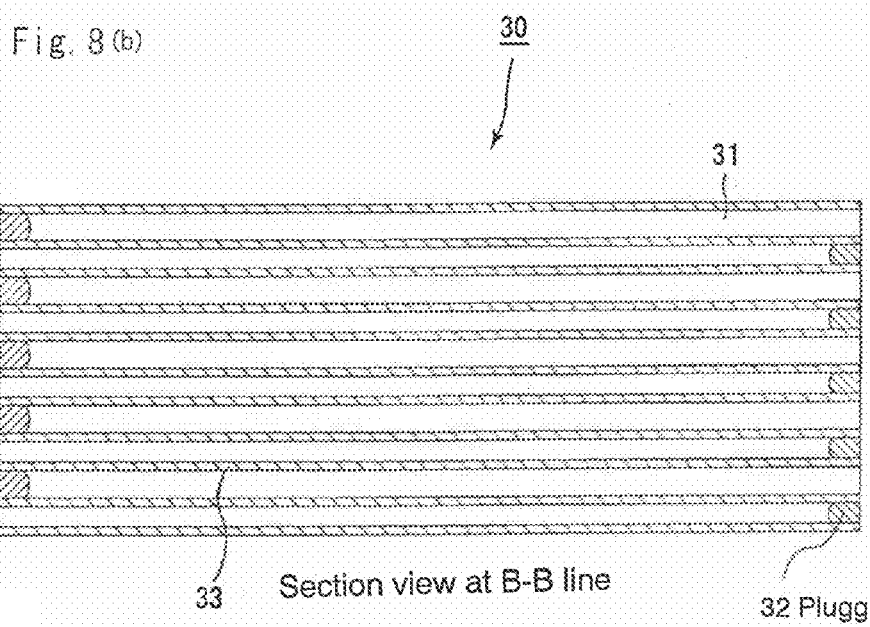
FIG. 8(b) is a section view along a line B-B in FIG. 8(a).

As an application of the honeycomb filter using the ceramic sintered body according to the invention, it is desirable to use in an exhaust gas purification apparatus for vehicles. FIG. 7 is a diagrammatically section view illustrating an embodiment of the exhaust gas purifying apparatus for vehicles equipped with the honeycomb structural body.

As shown in FIG. 7, the exhaust gas purifying apparatus 600 is mainly constituted with a honeycomb filter 60, a casing 630 covering the outside of the honeycomb filter 60, a keep seal material 620 disposed between the honeycomb filter 60 and the casing 630, and a heating means 610 arranged at an exhaust gas flowing side of the honeycomb filter 60. To an end portion of the casing 630 introducing the exhaust gas is connected an inlet pipe 640 connected to an internal-combustion engine such as an engine or the like, and the other end portion of the casing 630 is connected with a discharge pipe 650 connected to an exterior. Moreover, an arrow in FIG. 7 shows a flow of the exhaust gas.

In FIG. 7, the honeycomb filter 60 may be the one-piece type honeycomb filter 20 shown in FIG. 1 or the aggregate type honeycomb filter 10 shown in FIG. 6.

In the exhaust gas purification apparatus 600 having such a construction, the exhaust gas discharged from the internal-combustion engine such as engine or the like is introduced into the casing 630 through the inlet pipe 640 and flown into the honeycomb filter 60 from the cells open at a flowing side, passed cell walls to conduct purification by catching particulates with the cell walls and then discharged through the discharge pipe 650 to an exterior.

In the exhaust gas purification apparatus 600, when a large number of the particulates is stored on the cell walls of the honeycomb filter 60 to raise pressure loss, the regeneration treatment of the honeycomb filter 60 is conducted.

In the regeneration treatment, a gas heated by using the heating means 610 is flown into the inside of cells of the honeycomb filter 60, whereby the honeycomb filter 60 is heated and the particulates stored on the cell walls are combusted and removed. Also, the particulates can be combusted and removed by using a post injection system.

EXAMPLES

Hereinafter, examples of the invention will be concretely described with reference to the drawings. However, the invention is not limited to the examples only.

Example 1 of the Present Invention (1) A starting material paste is prepared by wet-mixing 70% by weight of α-type silicon carbide powder having an average particle size of 30 μm (silicon carbide coarse particles) with 30% by weight of α-type silicon powder having an average particle size of 0.5 μm (silicon carbide fine particles) and adding and kneading with 15 parts by weight of an organic binder (methyl cellulose) and 20 parts by weight of water based on 100 parts by weight of the resulting mixed powder. The silicon carbide fine particles are prepared by previously acid-cleaning with nitric acid, hydrofluoric acid, hydrochloric acid or the like, and then adding 0.7 parts by weight of iron powder having an average particle diameter of 0.1 μm and particle distribution within ±10% of the average particle size based on 100 parts by weight of silicon carbide fine particles.

Next, small amounts of a lubricant and a plasticizer are added to the starting material paste, mixed and kneaded, and thereafter extrusion molded to form a ceramic shaped body having a similar shape of the cross section as shown FIG. 1(a). Next, the ceramic shaped body is dried by a microwave drier to form a ceramic dried body, thereafter a paste having the same composition as that of the ceramic shaped body is filled in predetermined cells and again dried by the drier. Then, the dried body is degreased at 400° C. and fired at 1900° C. in an aragon atmosphere under an atmospheric pressure for 3 hours to obtain a honeycomb filter 20 comprising the silicon carbide sintered body as shown in FIG. 1 having a porosity of 50%, an average pore size of 12 μm, a size of 34 mm×34 mm×150 mm, 324 pieces of cells, and 0.4 mm thick of a cell wall 23.

(2) 16 filter units (4 units×4 units) with honeycomb structure are connected through a heat-resistant sealing material paste containing 30 wt % of alumina fibers of 0.2 mm in fiber length, 21 wt % of silicon carbide particles of 0.6 μm in average particle size, 15 wt % of silica sol, 5.6 wt % of carboxymethyl cellulose and 28.4 wt % of water and then cut with a diamond cutter to prepare a cylindrical ceramic block 15 having a diameter of 144 mm×a length of 150 mm. In this case, the thickness of the sealing material layer 14 for connecting one-piece type honeycomb filter units is adjusted to be 1.0 mm.

Next, a sealing material paste is prepared by mixing and kneading 23.3 wt % of ceramic fiber made of alumina silicate (shot content: 3%, fiber length: 0.1-100 mm) as an inorganic fiber, 30.2 wt % of silicon carbide powder having a average particle size of 0.3 μm as an inorganic particle, 7 wt % of silica sol ($SiO_2$ content in sol: 30 wt %) as an inorganic binder, 0.5 wt % of carboxymethyl cellulose as an organic binder and 39 wt % of water.

Then, a sealing material paste layer of 1.0 mm in thickness is formed around the outer peripheral portion of the honeycomb block 15 by using the sealing material paste. And, the sealing material paste layer is dried at 120° C. to prepare a cylindrical aggregate type honeycomb filter 10 having cylindrical shape as shown in FIG. 6 and mainly comprising of silicon carbide sintered bodies.

(3) $Al(NO_3)_3$ is poured in 1,3-butanediol solution and stirred at 60° C. for 5 hours to prepare 1,3-butanediol solution containing 30 wt % of $Al(NO_3)_3$. The aggregate type honeycomb structural body 10 is immersed into the 1,3-butanediol solution, then heated at 150° C. for 2 hours and at 400° C. for 2 hours, further immersed in water of 80° C. for 2 hours, and heated at 700° C. for 8 hours to form an alumina layer on the surface of the aggregate type honeycomb filter 10.

$Ce(NO_3)_3$ is poured in ethylene glycol and stirred at 90° C. for 5 hours to prepare ethylene glycol solution containing 6 wt % of $Ce(NO_3)_3$. The aggregate type honeycomb filter 10 having an alumina layer on the surface thereof is immersed into the ethylene glycol solution, and then heated at 150° C. for 2 hours and at 650° C. in nitrogen atmosphere for 2 hours to form catalyst layers comprising rare earth oxide-containing alumina layers on the surface of the aggregate type honeycomb filter 10.

Dinitrodiamine platinum nitrate ([$Pt(NH_3)_2(NO_2)_2$]$HNO_3$ having platinum concentration of 4.53 wt % is diluted with a distilled water, and the aggregate type honeycomb filter 10 having rare earth oxide-containing alumina layers on the surface thereof is immersed in the prepared solution to attach Pt of 2 g/L to the surface, and thereafter heated at 110° C. for 2 hours and at 500° C. in nitrogen atmosphere for 1 hour to carry a platinum catalyst having an average particle size of 2 nm on the surface of the aggregate type honeycomb filter 10.

Examples 2~11 of the Invention

A cylindrical-shaped aggregate type honeycomb filter 10 mainly comprising silicon carbide sintered bodies and carrying a platinum catalyst is prepared in the same manner as in Example 1 except for changing the average particle sizes of silicon carbide coarse particles and silicon carbide fine particles used in the preparation of starting material paste, the compounding ratio of the silicon carbide coarse particles and the silicon carbide fine particles used in the preparation of starting material paste, and the firing temperature when a ceramic dried body is fired to produce a one-piece type honeycomb filter 20 as shown in Table 1 below.

Reference Example 1

70% by weight of α-type silicon carbide powder having an average particle size of 30 μm (silicon carbide coarse particles) and 30% by weight of α-type silicon carbide powder having an average particle size of 0.5 μm (silicon carbide fine particles) are wet-mixed, and to 100 parts by weight of the obtained mixture are added and kneaded 15 parts by weight of an organic binder (methyl cellulose) and 20 parts by weight of water to prepare a starting material paste. The above silicon carbide fine particles are prepared by previously acid-cleaning with nitric acid, and then adding 0.7 parts by weight of iron powder having an average particle diameter of 0.1 μm and particle distribution within ±10% of the average particle diameter based on 100 parts by weight of silicon carbide fine particles.

Next, small amounts of a lubricant and a plasticizer are added to the starting material paste, further mixed and kneaded, and thereafter extrusion-molded to form a ceramic shaped body having a similar shape of the cross section as shown in FIG. 6. Then, the ceramic shaped body is dried by a microwave drier to form a ceramic dried body and thereafter a paste having the same composition as that of the ceramic shaped body is filled in predetermined cells and again dried by the drier. Then, the dried body is degreased at 400° C. and fired at 1900° C. in an aragon atmosphere under an atmospheric pressure for 3 hours to obtain a cylindrical-shaped honeycomb filter 30 comprising the silicon carbide sintered body shown in FIG. 6 having a porosity of 50%, an average pore size of 12 μm, 144 mm in diameter×150 mm in length, and cell wall 23 of 0.4 mm thick.

(2) To the honeycomb filter 30 prepared in aforementioned (1) is provided a catalyst in the same manner as (3) in Example 1 of the invention.

Comparative Examples 1~9

A cylindrical-shaped aggregate type honeycomb filter 10 mainly comprising silicon carbide sintered bodies and carrying a platinum catalyst is prepared in the same manner as in Example 1 except for changing the average particle sizes of silicon carbide coarse particles and silicon carbide fine particles used in the preparation of starting material paste, the compounding ratio of the silicon carbide coarse particles and the silicon carbide fine particles used in the preparation of starting material paste, the firing temperature when a ceramic dried body is fired to produce a one-piece type honeycomb filter 20, and particle distribution of iron powder added to silicon carbide fine particle as shown in Table 1 below.

In Comparative Example 2, small amounts of a lubricant and a plasticizer are added to starting material paste, further mixed and kneaded, and thereafter extrusion-molded to form a ceramic shaped body having a similar shape of the cross section as shown FIG. 1(*a*), but subsequent steps are not carried out due to defect of the obtained shaped body.

Further, the honeycomb structural body produced in Comparative Example 5 is weak in strength due to imperfect firing.

Comparative Example 10

(1) 70% by weight of α-type silicon carbide powder having an average particle size of 32.6 μm and 30% by weight of metallic silicon having an average particle size of 4.0 μm are wet-mixed, and to 100 parts by weight of the obtained mixture are added and kneaded 6 parts by weight of an organic binder (methyl cellulose), 2.5 parts by weight of surface-active agent, and 24 parts by weight of water to prepare a starting material paste.

Next, the starting material paste is extrusion-molded to prepare a ceramic shaped body having a similar shape of the cross section as shown FIG. 1(*a*). Next, the ceramic shaped body is dried by using a microwave drier to form a ceramic dried body and thereafter a paste having the same composition as that of the ceramic shaped body is filled in predetermined cells and again dried by the drier. Then, the dried body is degreased at 550° C. in an oxidizing atmosphere and fired at 1600° C. in an aragon atmosphere under an atmospheric pressure for 3 hours to obtain a one-piece type honeycomb filter 20 comprising silicon carbide-metallic silicon sintered body as shown in FIG. 1(*a*) having a porosity of 50%, an average pore size of 20 μm, a size of 34 mm×34 mm×150 mm, 324 pieces of cells, and a cell wall 23 of 0.4 mm thick.

(2) A cylindrical-shaped aggregate type honeycomb filter 10 mainly comprising silicon carbide-metallic silicon sintered bodies and carrying a platinum catalyst is produced in the same manner as Example 1 (2) and (3) except for using the one-piece type honeycomb filter 20 produced in aforementioned (1).

(Evaluation Test)
(1) Connecting State of Silicon Carbide Particles

Figure 9:
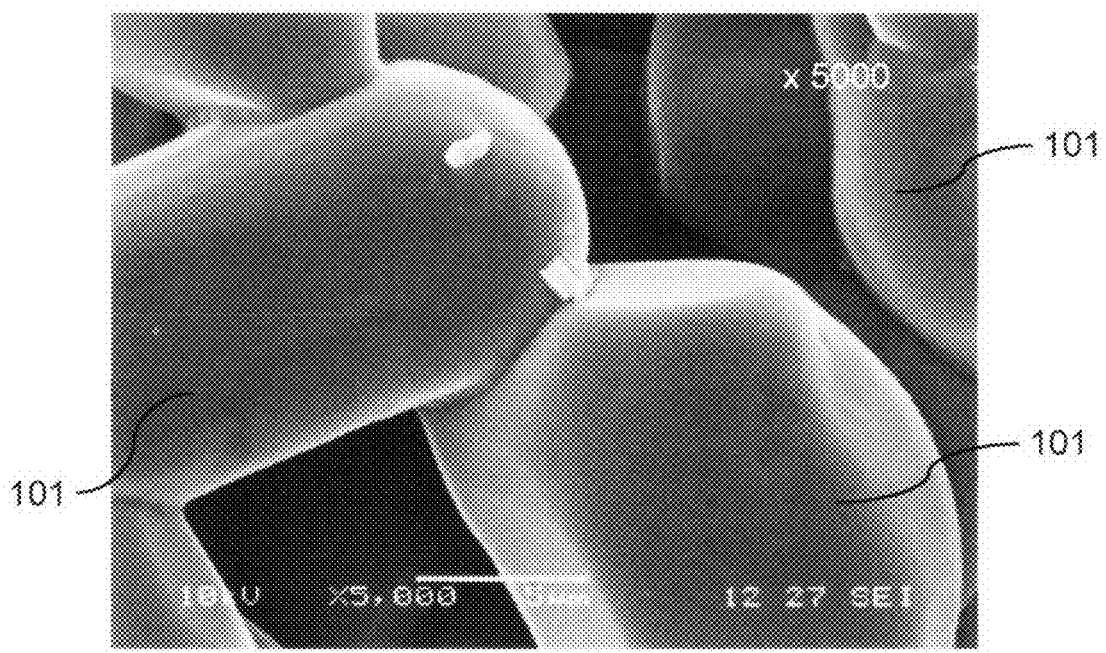
FIG. 9 is a SEM photograph of the silicon carbide sintered body in Comparative Example 7.

Each honeycomb filter according to Examples, Reference Example, and Comparative Examples is observed through SEM at a magnification of 2000 within a range of 10 mm×10 mm to examine whether each silicon carbide coarse particle are connected through more than one silicon carbide fine particles, and/or polycrystalline body formed by silicon carbide particles, that is, presence or absence of connecting portions. The results are shown in Table 1. The SEM photograph of Example 10 at 2000 magnification is shown in FIG. 2. The SEM photograph of Comparative Example 7 at 5000 magnification is shown in FIG. 9.

(2) Presence or Absence of Cracks in Regeneration Treatment

An exhaust gas purifying apparatus as shown FIG. 6 is produced and disposed in an exhaust path of an engine by using the honeycomb structural body according to Examples, Reference Example, and Comparative Examples. The engine is driven at a driving state of a revolution number of 3000 rpm and a torque of 50 Nm for given period of time, and thereafter regeneration treatment (post injection system) is repeated 100 times to observe if a crack is generated in the honeycomb structural body through visual observation and SEM observation. The results are shown in Table 1.

The SEM photograph at 5000 magnification of Reference Example 1 after this test is shown in FIG. 3. Moreover, the TEM photograph of Example 1 before this test is shown in FIG. 4. As a result of conducting qualitative analysis and element mapping, it turned out that a lower-left portion is a single-crystal silicon carbide of coarse particle 101 and silicon carbide of fine particles 102 is polycrystallized to form a bonding layer 103 at a right-upper portion. It also turned out to be a case 105 (white portion) wherein iron is contained between fine particles.

Figure 5A:
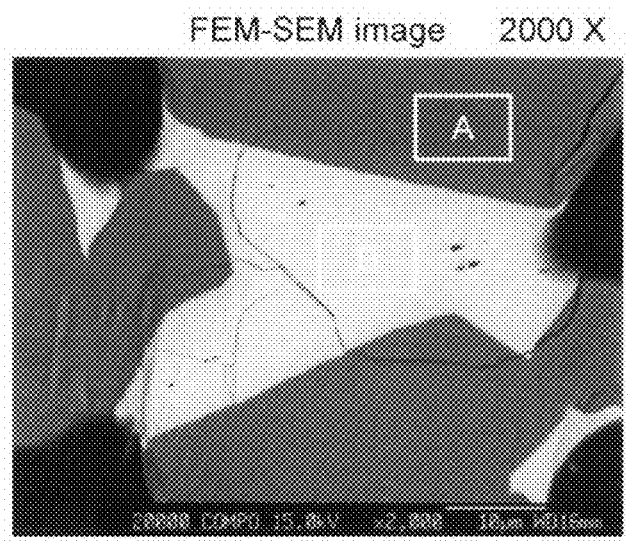
FIG. 5(a) is a FE-SEM photograph (2000 magnification) of a cross section of the bonded state in Reference Example 1.
Figure 5B:
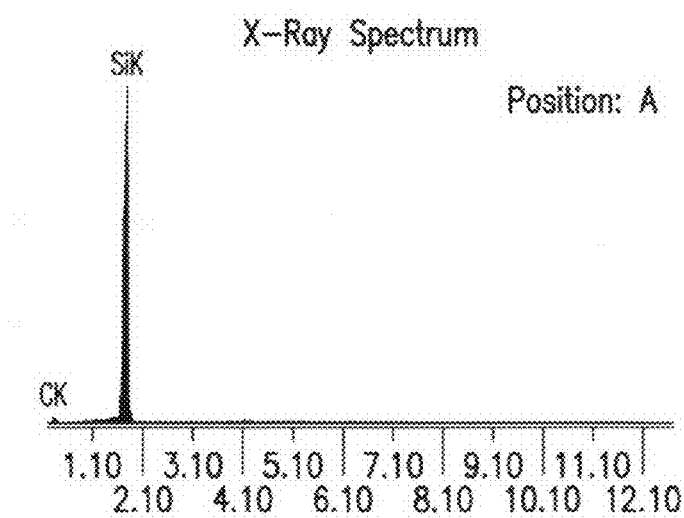
FIG. 5(b) and FIG. 5(c) are X-ray spectral figures of elemental analysis at positions A and B in FIG. 5(a), respectively.
Figure 5C:
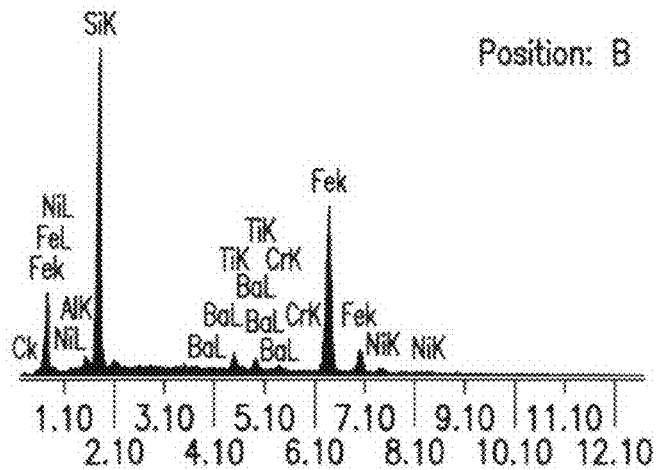

FIG. 5(a) shows a result of measuring the same Example through FE-SEM at 2000 magnification, and FIGS. 5(b) and (c) are X-ray spectral figures of results of conducting qualitative analysis to element analysis at each position of A and B in FIG. 5(a) using X-ray. As shown in these figures, coarse particles 101 can be observed in A, and iron, aluminium, nickel, titanium, and chromium can be observed in B.

(3) An Average Particle Size of Platinum Catalyst after Regeneration Treatment

In the honeycomb structural body according to each of Examples, Reference Example, and Comparative Examples after the evaluation test (2), a platinum catalyst is observed through a transmission electron microscope (TEM) to obtain an average particle size. The results are shown in Table 1.

TABLE 1

| | average particle size (μm) | | ratio of average particle size | compounding ratio (coarse particle:fine particle) | particle size distribution to an average particle size of iron powder (%) | firing temperature (° C.) | presence or absence of bonding layer | presence or absence of crack | average particle size of platinum (nm) |
|---|---|---|---|---|---|---|---|---|---|
| | coarse particle | fine particle | | | | | | | |
| Example 1 | 30 | 0.5 | 60 | 7:3 | 10 | 1900 | presence | absence | 15 |
| Example 2 | 40 | 0.5 | 80 | 7:3 | 10 | 2000 | presence | absence | 15 |
| Example 3 | 50 | 0.5 | 100 | 7:3 | 10 | 2050 | presence | absence | 15 |
| Example 4 | 60 | 0.5 | 120 | 7:3 | 10 | 2100 | presence | absence | 15 |
| Example 5 | 70 | 0.5 | 140 | 7:3 | 10 | 2150 | presence | absence | 15 |
| Example 6 | 40 | 0.5 | 80 | 5:5 | 10 | 2000 | presence | absence | 15 |
| Example 7 | 40 | 0.5 | 80 | 9:1 | 10 | 2000 | presence | absence | 15 |
| Example 8 | 40 | 0.5 | 80 | 7:3 | 10 | 1800 | presence | absence | 15 |
| Example 9 | 40 | 0.5 | 80 | 7:3 | 10 | 2200 | presence | absence | 15 |
| Example 10 | 30 | 2.0 | 15 | 7:3 | 10 | 1900 | presence | absence | 15 |
| Example 11 | 40 | 0.2 | 200 | 7:3 | 10 | 1900 | presence | absence | 15 |
| Reference Example 1 | 30 | 0.5 | 60 | 7:3 | 10 | 1900 | presence | presence (fine crack) | 15 |
| Comparative Example 1 | 25 | 0.5 | 50 | 7:3 | 50 | 1900 | absence | presence | 15 |
| Comparative Example 2 | 80 | 0.5 | 160 | 7:3 | 50 | — | — | — | — |
| Comparative Example 3 | 40 | 0.5 | 80 | 10:0 | — | 2000 | absence | presence | 15 |
| Comparative Example 4 | 40 | 0.5 | 80 | 4:6 | 50 | 2000 | absence | presence | 15 |
| Comparative Example 5 | 40 | 0.5 | 80 | 7:3 | 50 | 1600 | — | — | — |
| Comparative Example 6 | 40 | 0.5 | 80 | 7:3 | 50 | 2300 | absence | presence | 15 |
| Comparative Example 7 | 11 | 0.5 | 22 | 7:3 | 50 | 2200 | absence | presence | 15 |
| Comparative Example 8 | 20 | 2.0 | 10 | 7:3 | 50 | 1900 | absence | presence | 15 |
| Comparative Example 9 | 50 | 0.2 | 250 | 7:3 | 50 | 2000 | absence | presence | 15 |
| Comparative Example 10 | 32.6 | 4.0 | 8 | 7:3 | — | 1600 | presence | absence | 50 |

As shown in Table 1, in the honeycomb filter having the bonding layer according to Examples 1-11, visible cracks are not generated even if the regeneration treatment is conducted repeatedly. While, in the honeycomb filter according to Reference Example 1, fine cracks can be observed through SEM observation as the outer peripheral surface is not fastened with the sealing material.

Further, in the honeycomb structural body formed by sintering silicon carbide particles only, the average particle diameter of platinum catalyst after repeatedly conducting regeneration treatment is smaller and the activity of the platinum catalyst is higher as compared with the honeycomb structural body formed by sintering silicon carbide and metallic silicon (Comparative Example 10).

Conventional Example

A porous silicon carbide sintered body disclosed in JP-A-S60-264365 is characterized in that three-dimensional net-like structure is constituted by plate crystals of silicon carbide and is entirely different from the ceramic sintered body according to the invention constituting porous structure by silicon carbide particles having different particle sizes.

Further, JP-A-H4-187578 discloses a method of manufacturing a sintered body comprising α-type silicon carbide powder having a large particle size and β-type silicon carbide powder having small particle size wherein the sintered body can be formed by grain-growing the β-type silicon carbide without grain-growing the high-temperature and stable α-type silicon carbide.

Also in JP-A-H5-139861, JP-A-H9-202671 and JP-A-2000-16872, the manufacturing method for sintered body comprising similar silicon carbide is disclosed.

In each of these conventional examples, however, volume diffusion between silicon carbide coarse particles and grain boundary diffusion are sufficiently developed. In addition, they relate to a technique for constructing the same crystal structure by uniting silicon carbide coarse particles and silicon carbide fine particles through phase-transition of unstable β-type silicon carbide powder to α-type silicon carbide powder, which is different from the bonding layer of the present invention.

A porous silicon carbide sintered body disclosed in JP-A-2001-97776 is characterized in that the neck portion curves gently and the firing is carried out at a high temperature so as to make the neck portion smooth, so that the silicon carbide fine particles do not retain the form of particle after firing and the bonding layer is not formed by polycrystalline body, hence, the sintered body is different from the ceramic sintered body of the invention.

INDUSTRIAL APPLICABILITY

The application of the ceramic sintered body is not particularly limited, but is useful, for example, in the semiconductor manufacturing field for substrates for ceramic heater, probe card, wafer prober and the like, and/or in the filed of substrate for inspection apparatus, substrate for integrated circuits, substrate for liquid crystal display, and ceramic filter.

The invention claimed is:

1. A ceramic porous sintered body, comprising:
 a plurality of ceramic coarse particles comprising α silicon carbide; and
 a plurality of polycrystalline bodies each forming a bonding layer and connecting the ceramic coarse particles such that the ceramic porous sintered body has an average pore diameter of 5 μm to 50 μm,
 wherein each of the polycrystalline bodies includes a plurality of ceramic fine particles comprising α silicon carbide and binding such that the ceramic fine particles form the bonding layer comprising an aggregate of the ceramic fine particles which are not fused to one another, and the ceramic fine particles have an average particle size smaller than an average particle size of the ceramic coarse particles such that a ratio of the average particle size of the ceramic coarse particles to the average particle size of the ceramic fine particles is 15:1-200:1.

2. The ceramic porous sintered body according to claim 1, wherein the ceramic coarse particles comprise single-crystal particles.

3. The ceramic porous sintered body according to claim 1, wherein the bonding layer is a brittle body having a strength lower than a strength of the ceramic coarse particles.

4. The ceramic porous sintered body according to claim 1, wherein the bonding layer and the ceramic coarse particles include sintering aids, respectively, and a content of the sintering aid in the bonding layer is higher than a content of the sintering aid in the ceramic coarse particles.

5. The ceramic porous sintered body according to claim 1, wherein a ratio of a total weight of the ceramic coarse particles to a total weight of the ceramic fine particles is 1:1-9:1.

6. The ceramic porous sintered body according to claim 1, wherein the average particle size of the ceramic coarse particle is 30 μm to 70 μm.

7. The ceramic porous sintered body according to claim 1, wherein the average particle size of the ceramic fine particle is 0.1 μm to 20 μm.

8. The ceramic porous sintered body according to claim 1, further comprising:
 a sealing layer on an outer periphery of the porous sintered body.

9. The ceramic porous sintered body according to claim 1, wherein said bonding layer includes at least one sintering aid selected from the group consisting of iron, nickel, titanium, chromium, and a metal oxide thereof.

10. A ceramic filter, comprising:
 a pillar-shaped porous ceramic member having a plurality of cells extending in a longitudinal direction of the pillar-shaped porous ceramic member, the pillar-shaped porous ceramic member comprising a ceramic porous sintered body including a plurality of ceramic coarse particles and a plurality of polycrystalline sintered bodies connecting the ceramic coarse particles such that the ceramic porous sintered body has an average pore diameter of 5 μm to 50 μm, the ceramic coarse particles comprising α silicon carbide, each of the polycrystalline sintered bodies forming a bonding layer connecting the ceramic coarse particles,
 wherein each of the polycrystalline bodies includes a plurality of ceramic fine particles comprising α silicon carbide and binding such that the ceramic fine particles form the bonding layer comprising an aggregate of the ceramic fine particles which are not fused to one another, and the ceramic fine particles have an average particle size smaller than an average particle size of the ceramic coarse particles such that a ratio of the average particle size of the ceramic coarse particle to the average particle size of the ceramic fine particles is 15:1-200:1.

11. The ceramic filter according to claim 10, wherein the ceramic coarse particles comprise single-crystal particles.

12. The ceramic filter according to claim 10, wherein the bonding layer is brittle body having a strength lower than a strength of the ceramic coarse particles.

13. The ceramic filter according to claim 10, wherein the bonding layer and the ceramic coarse particles include sintering aids, respectively, and a content of the sintering aid in the bonding layer is higher than a content of the sintering aid in the ceramic coarse particles.

14. The ceramic filter according to claim 10, wherein a ratio of a total weight of the ceramic coarse particles to a total weight of the ceramic fine particles is 1:1-9:1.

15. The ceramic filter according to claim 10, wherein the average particle size of the ceramic coarse particle is 30 μm to 70 μm.

16. The ceramic filter according to claim 10, wherein the average particle size of the ceramic fine particle is 0.1 μm to 20 μm.

17. The ceramic filter according to claim 10, further comprising:
 a sealing layer on an outer periphery of the porous sintered body.

18. The ceramic filter according to claim 10, wherein said bonding layer includes at least one sintering aid selected from the group consisting of iron, nickel, titanium, chromium, and a metal oxide thereof.

19. A ceramic porous sintered body, comprising:
 a plurality of ceramic coarse particles comprising α silicon carbide; and
 a plurality of polycrystalline sintered bodies each forming a bonding layer and connecting the ceramic coarse particles such that the ceramic porous sintered body has an average pore diameter of 5 μm to 50 μm,
 wherein each of the polycrystalline sintered bodies includes a plurality of ceramic fine particles comprising α silicon carbide and binding such that the ceramic fine particles form the bonding layer comprising an aggregate of the ceramic fine particles which are not fused to one another, and the ceramic fine particles have an average particle size smaller than an average particle size of the ceramic coarse particles.

20. The ceramic porous sintered body according to claim 19, wherein said bonding layer includes at least one sintering aid selected from the group consisting of iron, nickel, titanium, chromium, and a metal oxide thereof.

* * * * *